United States Patent [19]

Pattillo

[11] 4,083,508
[45] Apr. 11, 1978

[54] TAPE STORAGE REEL WITH INSERT FOR DECREASING TAPE STORAGE CAPACITY

[75] Inventor: Luther A. Pattillo, Opelika, Ala.

[73] Assignee: Data Technology Corporation, Costa Mesa, Calif.

[21] Appl. No.: 751,388

[22] Filed: Dec. 17, 1976

[51] Int. Cl.² .................. B65H 75/14; B65H 75/18
[52] U.S. Cl. ............................... 242/68.5; 242/71.8
[58] Field of Search ............... 242/71.8, 68.5, 72, 242/74, 74.1, 74.2, 68

[56] References Cited

U.S. PATENT DOCUMENTS

| | | | |
|---|---|---|---|
| 2,703,684 | 3/1955 | Warfield | 242/72 |
| 2,881,985 | 4/1959 | Overmire et al. | 242/71.8 |
| 3,220,663 | 11/1965 | Plato | 242/71.8 |
| 3,485,457 | 12/1969 | Hultgren | 242/71.8 |
| 3,545,696 | 12/1970 | Berkey | 242/71.8 |
| 3,973,740 | 8/1976 | Schankler | 242/74 |

Primary Examiner—George F. Mautz
Attorney, Agent, or Firm—Lowhurst & Aine

[57] ABSTRACT

A standard magnetic tape storage reel in combination with an insert for decreasing the tape storage capacity of the reel. The insert fits over the hub of the reel and is welded to the flanges. The insert is of integral construction and includes an inner circular rim portion which has an opening dimensional to fit over the reel hub, an outer circular rim portion which forms the new hub about which the tape is wound, a flat central web rib portion which extends between the outer and the inner rim, a plurality of radial ribs extending on both sides of the central web rib portion between the inner and outer rim portions, and a circumferential rib, concentric with the rim portions, located on either side of the web integrally connecting the radial ribs and the central web rib portion.

8 Claims, 4 Drawing Figures

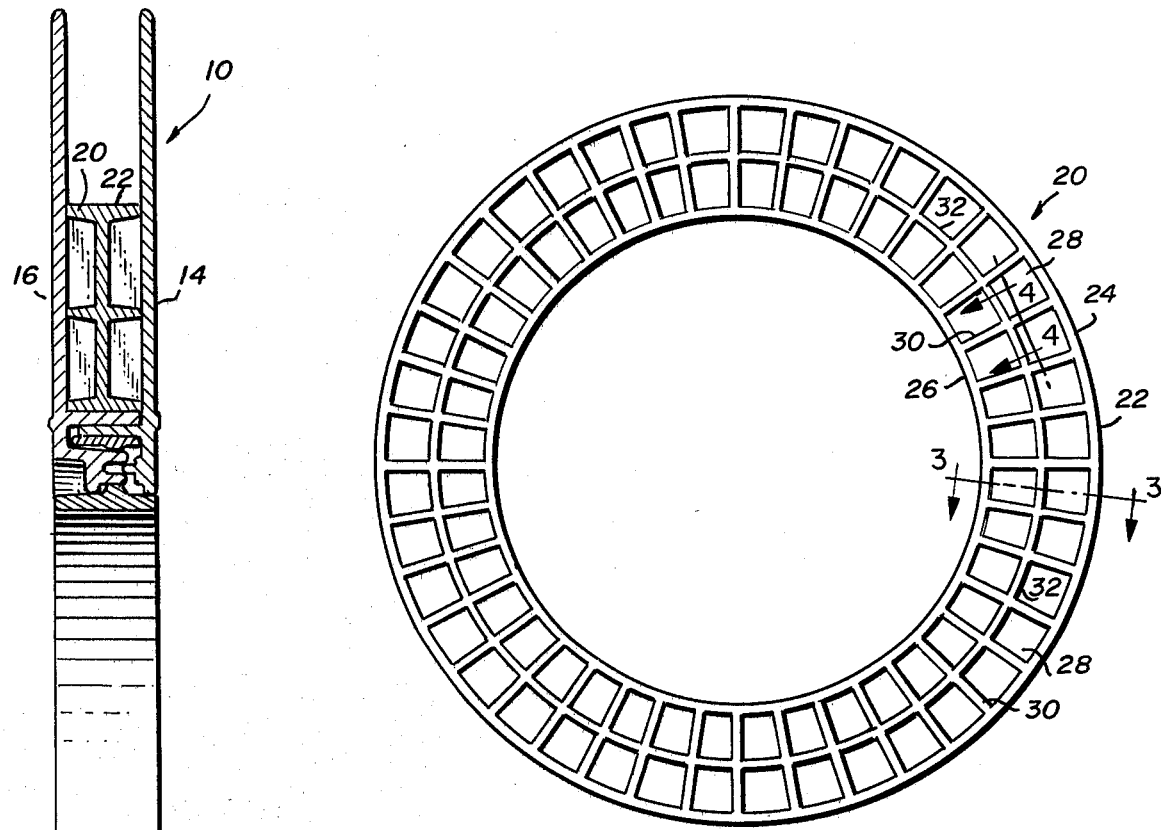
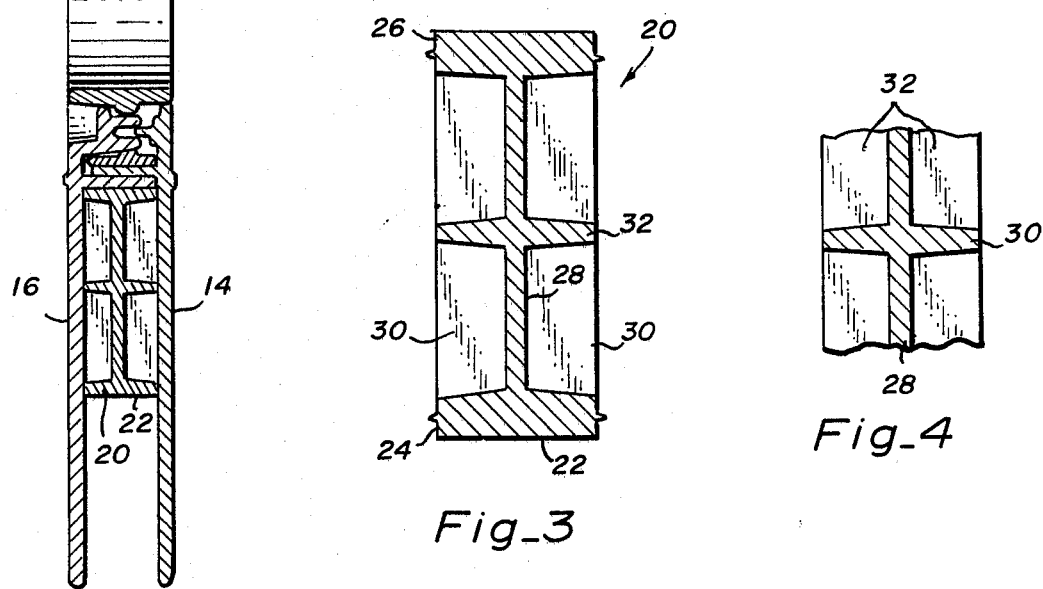
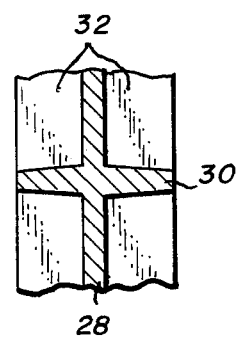
Fig_1
Fig_2
Fig_3
Fig_4

TAPE STORAGE REEL WITH INSERT FOR DECREASING TAPE STORAGE CAPACITY

BACKGROUND OF THE INVENTION

This invention relates to reels for the storage of magnetic tapes, such as the tapes used in data processing which include information in the form of magnetically coded characters. Magnetic tape reels have been standardized in a number of respects so that they can be used exchangeably with a wide range of data processing equipment. Usually reels have the same hub configuration so that they can be used with a wide range of computers and the like and have the same outside diameter so they can be driven on the computer drive unit and stored on the same storage device, such as one using a flexible band with a latch and a hook so the reel can be suspended as shown in U.S. Pat. No. 3,310,178 which issued on Mar. 21, 1967.

As a result of such standardization, the tape capacity of magnetic tape reels and cartridges has also become standard, namely 2400 feet of magnetic tape. Also, a large portion of the computer industry uses Easy-Load Cartridges, such as are purchased from IBM and identified as Model 2420 which accept a standard 10½ inch reel having a capacity of 2400 feet of tape. As a result of such standardization, the user of a reel has to wind 2400 feet of tape on a reel even though a considerably lesser amount may be required when using the cartridge type drive unit and storage system. Utilizing 2400 feet of tape when only 1200 feet of tape is required is wasteful as to cost and time since tape is quite expensive and takes time to wind on and unwind from a reel.

One obvious solution would be to construct a smaller than standard reel, but that has the disadvantage of requiring special drive units, special storage racks, and special loading machines which is inconvenient and flies in the fact of standardization.

SUMMARY OF THE INVENTION

In accordance with the present invention, a standard tape reel is provided with an insert around the hub which has an outside diameter such that it will hold a preselected amount of tape which is less than 2400 feet, such as for example, 1200 feet. This insert is placed on the hub when the standard reel is assembled and the only additional step required is to sonically weld the insert to the flanges.

In constructing such inserts, a number of problems have been encountered which include, inter alia, the phenomena of crush and of sink. Crush is defined as the change of outside diameter of the insert when the same is compressed under the standard tape winding tension of about eight ounces. The forces on the hub resulting from such winding tension are considerable and if the hub has any tendency to shrink or to "crush," the tape already wound on the insert would become loose and buckle as more tape is wound on the reel, resulting in the destruction of the tape. It has been found that the maximum allowable crush cannot exceed 0.008 of an inch.

Sink is defined as the caving in of the center of the insert so that the outer cylindrical surface of the insert would have a lesser diameter at the center than at the sides, thereby creating a concave surface. As a result thereof, the tape, after being wound on the insert, is stretched more at the edges than in the center, resulting in tape distortion not acceptable to computer tape.

Somehow, the sink of an insert is associated with the amount of underlying material and a completely solid insert of plastic placed over the hub of a standard reel has been found to produce unacceptable sink.

It is therefore an object of the present invention to provide an insert, for use with a standard tape reel, that has a minimum crush and sink and can be used with the cartridge type drive and storage units.

It is a further object of the present invention to provide an insert for a tape reel, i.e., one having a standard hub and flange configuration, which provides any desired tape capacity and which has acceptable sink and crush.

It is another object of the present invention to provide a tape reel insert for a standard tape reel that can be used to change the capacity of a standard tape reel and that will not in any way influence the other standard feature of the tape reel except the capacity.

BRIEF DESCRIPTION OF THE DRAWINGS

FIG. 1 is an elevational side view of a standard tape reel having the insert of the invention mounted over its hub, with certain parts being removed or broken away to show internal construction;

FIG. 2 is an elevational side view of the insert of this invention shown in FIG. 1;

FIG. 3 is a cross-sectional view taken along lines 3—3 of FIG. 2; and

FIG. 4 is a cross-sectional view taken along lines 4—4 of FIG. 2.

DESCRIPTION OF THE PREFERRED EMBODIMENTS

Referring now to the drawings, there is shown in FIG. 1 a standard tape reel 10 including a hub 12 and a pair of flanges 14 and 16. Around hub 12 and between flanges 14 and 16 is shown an insert 20, having an outer surface 22 which forms the hub of the reel-insert combination upon which the tape can be wound.

As shown in more detail in FIG. 2, insert 20 is of unitary construction and comprises an outer rim portion 24 whose outer surface is the tape reel surface 22 and an inner rim portion 26 which has an inner diameter dimensioned to slidingly fit over hub 12 of the reel 10. Outer rim portion 24 and inner rim portion 26 are connected by a flat web rib 28, as best seen in FIG. 3. A plurality of radial ribs 30 are provided on both sides of web rib 28, as best seen in FIG. 3. Finally, a circular rib 32, concentric with rims 24 and 26 is provided, approximately midway therebetween on either side of web rib 28.

Insert 20 is preferably of unitary construction and is molded from a polystyrene material. Outer rim portion 24 is also provided with continuous sonic beads 34 and 36, respectively, on either side of the rim. In the preferred embodiment of the invention, beads 34 and 36 are triangular in cross-sectional shape, have a height of approximately 0.008 inches and a width at the base of approximately 0.012 inches. After insert 20 is placed over hub 12 on assembly of the reel-insert combination, the sonic beads 34 and 36 are in pressure contact with flanges 14 and 16, respectively. A sonic welder is utilized to make a weld between the outer edges of outer rim 24 and the flanges of the reel to provide a firm structure preventing the tape from spreading the flanges.

It has been found that optimum results are obtained, i.e., minimum sink and crush, by making rim portions 24 and 26 each approximately ⅛ of an inch thick. It has further been found that a thickness of about 50% of the rim thickness for central web rib 32, radial ribs 30 and circular rib 32 is most satisfactory.

As far as the number of radial ribs 30 on each side of web rib 28 are concerned, 40 ribs have been found satisfactory, whereas 30 were not enough and 50 were too many. Further, if the radial ribs are made much thicker than 50% of the rim thickness, say above 80% of the rim thickness, the problem of the sink was again encountered, indicating that radial rib thickness is somewhat critical.

There has been described an insert for a standard tape reel which is able to withstand the forces applied by the tape without undue or unacceptable sink and crush. While the exact number and thickness of the ribs for minimum sink and crush is probably given herein before point to certain ranges for best results. For example, the thickness of the web, radial and circular ribs should be somewhere between 40 – 70% of the rim thickness and the number of radial ribs should be somewhere between 30 and 50.

There has been described an insert that can be added to a standard tape reel to change its capacity to any length tape less than the original or standard capacity. The insert, to have acceptable crush and sink, requires that it be constructed with ribs and rims as explained herein before.

What is claimed is:

1. In combination with a magnetic tape reel having a central hub and a pair of parallel, substantially circular, flanges spaced apart to accommodate a standard tape, an insert disposed over said hub and abutting said flanges, said insert comprising:
   an inner circular continuous nonresilient nonmetallic rim portion having an internal diameter dimensioned for a sliding fit over said central hub;
   an outer circular continuous nonresilient nonmetallic rim portion concentric with said inner rim portion having an external diameter selected according to the desired length tape to be stored on said magnetic tape reel, the outer peripheral surface of said outer rim portion forming the hub of the reel-insert combination;
   a flat central continuous nonmetallic web rib portion extending between said rims and being symmetrical with respect to the edges of said rims;
   a plurality of nonmetallic radial ribs, greater than ten in number, extending on both sides of said web rib portion between said rim portions; and
   a nonmetallic circumferential rib, concentric with said rim portion, on either side of said web rib portion, said circumferential rib integrally connecting said radial ribs and said web rib portion.

2. The combination of claim 1 further including means for fastening opposite edges of said outer rim portion to the adjacent flanges.

3. The combination of claim 1 in which the opposite outer edges of said inner and outer rim portion, said radial ribs and said circular rib portion are coplanar.

4. The combination of claim 1 in which not less than 30 and no more than 50 radial ribs are provided on either side of said web rib portion.

5. The combination of claim 1 in which the thickness of said radial ribs is not less than 40% and not more than 70% of the thickness of said outer rim portion.

6. The combination of claim 2 in which between 30 and 50 radial ribs are provided on either side of said web rib portion and in which the thickness of each radial rib is maintained between 40 and 70% of the thickness of said outer rim portion.

7. An insert for a magnetic tape reel having a central hub and a pair of spaced apart circular flanges to decrease tape capacity, said insert being disposed over said hub and abutting said flanges, and comprising:
   an inner circular, continuous nonresilient and nonmetallic rim having an internal diameter for providing a sliding fit over said central hub;
   an outer circular continuous nonresilient and nonmetallic rim having an external diameter selected according to the desired length tape to be stored on the reel, the outer peripheral surface of said outer rim forming the hub on which the tape is to be wound;
   a flat central continuous nonmetallic web rib integrally connecting said rims so that they are concentric, said web rib being symmetrical with respect to the outer edges of rims;
   a plurality of nonmetallic radial ribs integrally connected to said inner rim, said outer rim, and said web rib on both sides of said web rib; and
   a nonmetallic circumferential rib concentric with said rims on either side of said web rib, said circumferential rib integrally connecting said radial ribs and said web rib.

8. The insert in accordance with claim 7 further including means for fastening opposite outer edges of said outer rim to opposite flanges.

* * * * *